US00RE47281E

(19) United States
(12) Reissued Patent
Williams

(10) Patent Number: US RE47,281 E
(45) Date of Reissued Patent: Mar. 12, 2019

(54) V-SHAPED FOUR BICYCLE CARRIER

(71) Applicant: LET'S GO AERO, INC., Colorado Springs, CO (US)

(72) Inventor: Marty Williams, Colorado Springs, CO (US)

(21) Appl. No.: 29/649,450

(22) Filed: May 30, 2018

Related U.S. Patent Documents

Reissue of:
(64) Patent No.: Des. 722,289
Issued: Feb. 10, 2015
Appl. No.: 29/454,713
Filed: May 13, 2013

U.S. Applications:
(63) Continuation-in-part of application No. 11/697,294, filed on Apr. 5, 2007, now Pat. No. 8,899,456.

(51) LOC (11) Cl. ..... 12-16
(52) U.S. Cl.
USPC ..... D12/408
(58) Field of Classification Search
USPC ..... D12/406, 407, 408, 412, 414
CPC .. B60R 9/10; B60R 9/04; B60R 11/00; B60R 9/045; B60R 9/048
See application file for complete search history.

(56) References Cited

U.S. PATENT DOCUMENTS 1,440,471 A * 1/1923 Kohler ..... G10G 5/00 248/434
5,320,227 A * 6/1994 Minoura ..... B25H 1/0014 211/22
5,375,497 A * 12/1994 Pirchio et al. ..... G10G 5/00 248/443
5,388,736 A * 2/1995 Schmidt ..... B60R 9/06 224/520
5,588,574 A * 12/1996 Schmidt ..... B60R 9/06 224/518
5,950,892 A * 9/1999 Tsai ..... B60R 9/06 224/497
D434,362 S * 11/2000 McCoy et al. ..... D12/406
D436,074 S * 1/2001 McCoy et al. ..... D12/407
8,367,919 B2 * 2/2013 Belitz et al. ..... G10G 5/00 84/453
D684,917 S * 6/2013 Williams ..... D12/408
(Continued)

*Primary Examiner* — Philip S Hyder
(74) *Attorney, Agent, or Firm* — Lynette Wylie; Apex Juris, pllc.

(57) CLAIM

The ornamental design for a V-shaped four bicycle carrier, as shown and described.

DESCRIPTION

FIG. 1 is an elevated angled view of the V-shaped four bicycle carrier.
FIG. 2 is an exploded view of the V-shaped four bicycle carrier components.
FIG. 3 is a front view of the V-shaped four bicycle carrier with a bicycle attached thereto.
FIG. 4 is a back side view of the V-shaped four bicycle carrier.
FIG. 5. is a front side view of the V-shaped four bicycle carrier.
FIG. 6 is a side view of the V-shaped four bicycle carrier.
FIG. 7 is a top view of the V-shaped four bicycle carrier; and,
FIG. 8 is a bottom side view of the V-shaped four bicycle carrier.
The broken lines illustrate unclaimed environmental structure.

1 Claim, 8 Drawing Sheets

Figure 1:
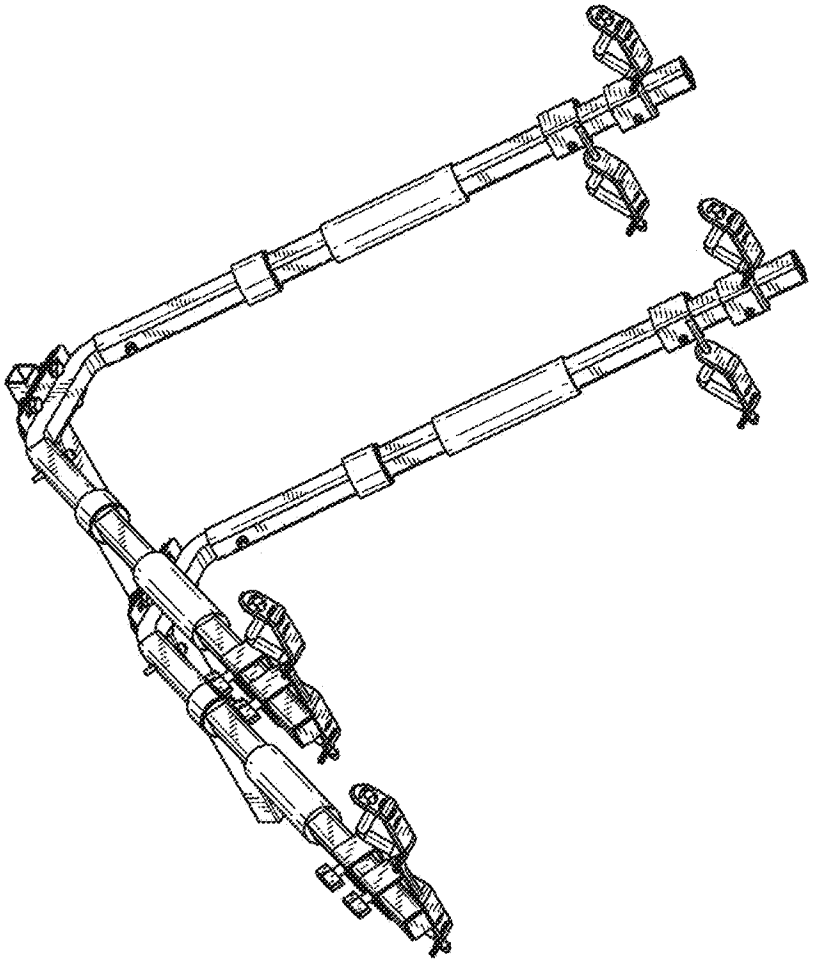
Figure 2:
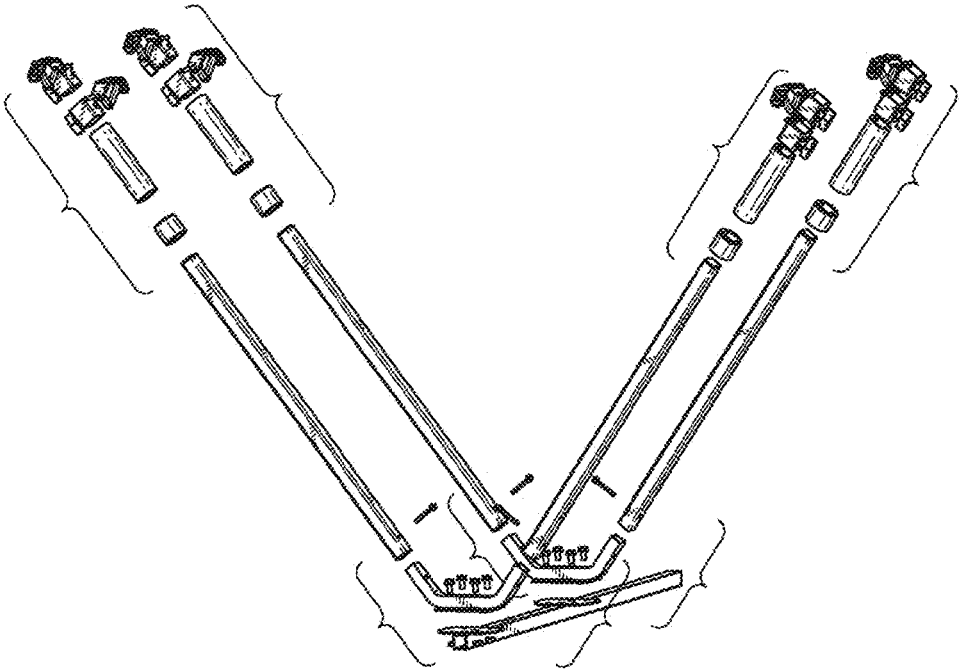
Figure 3:
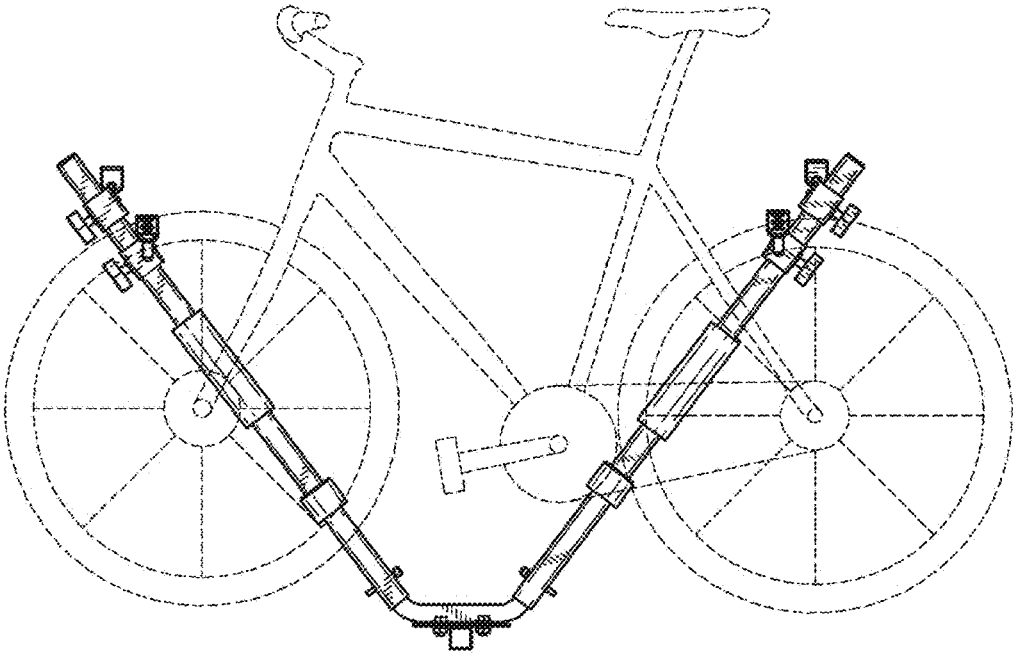
Figure 4:
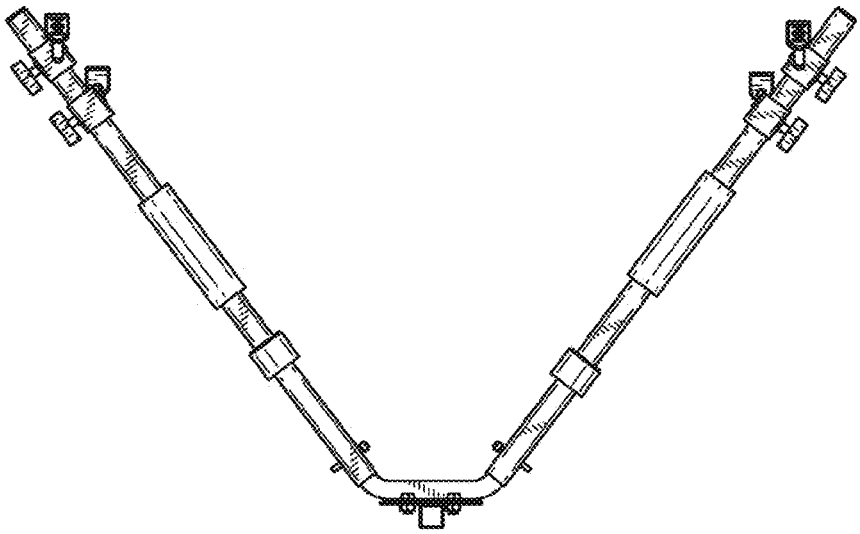
Figure 5:
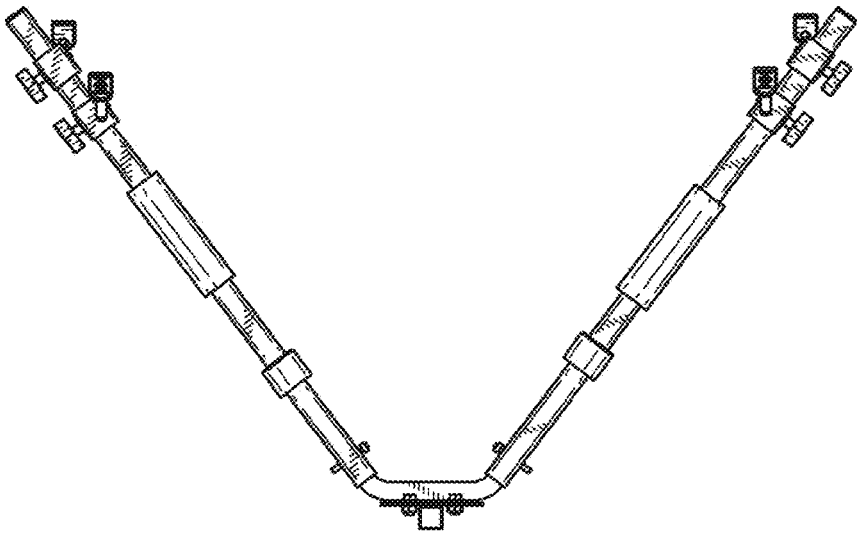
Figure 6:
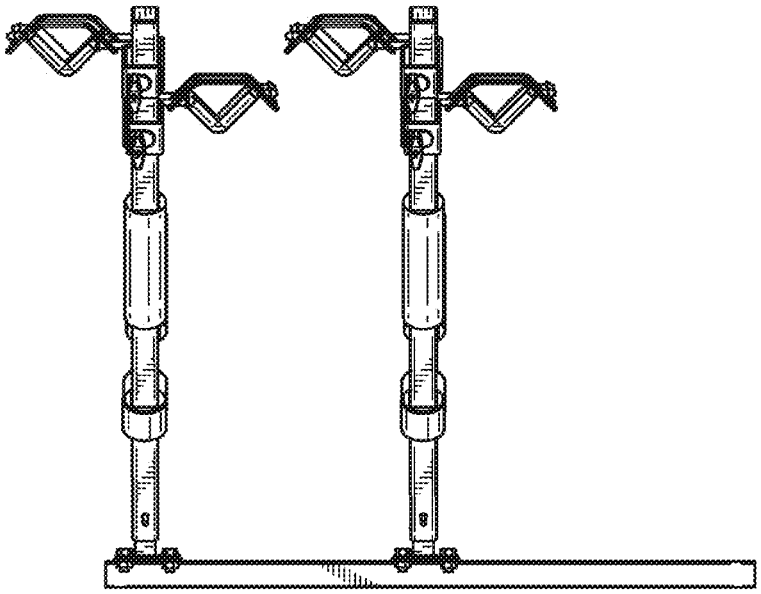
Figure 7:
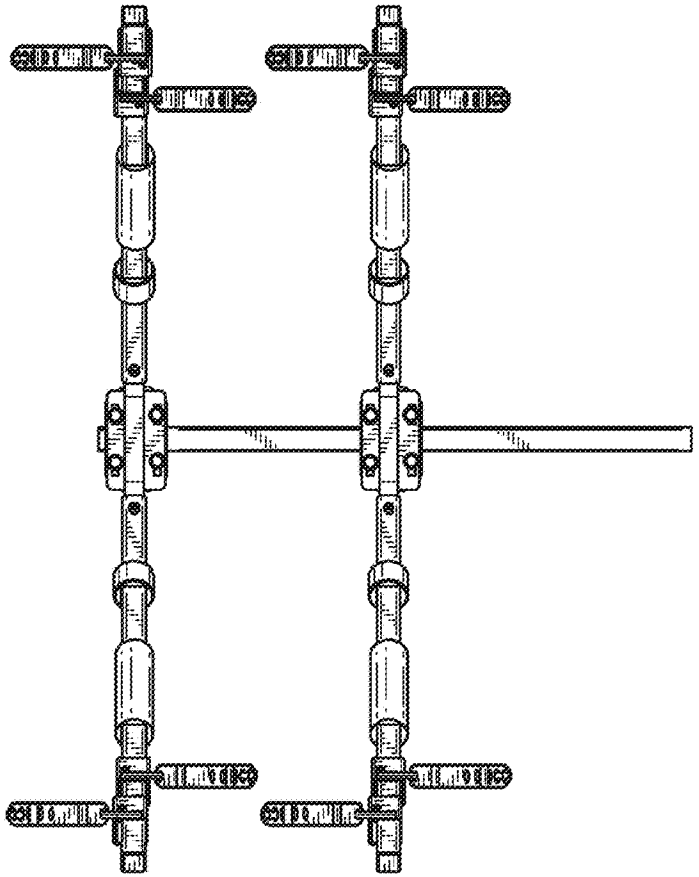
Figure 8:
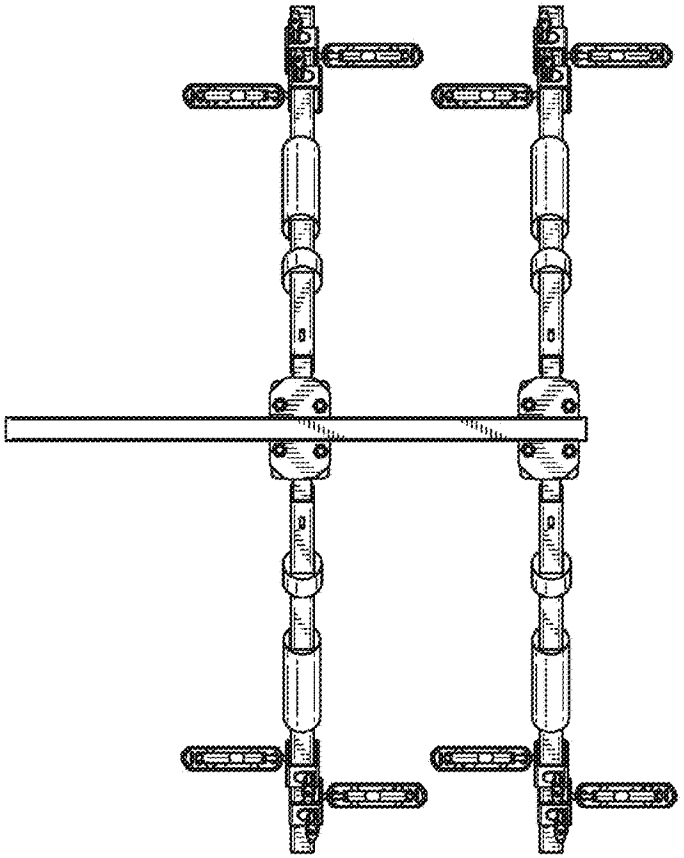

Matter enclosed in heavy brackets [ ] appears in the original patent but forms no part of this reissue; matter printed in italics indicates the additions made by reissue.

(56) References Cited

U.S. PATENT DOCUMENTS

| | | | | |
|---|---|---|---|---|
| 2004/0256430 | A1* | 12/2004 | Wang | B60R 9/06 224/520 |
| 2005/0205629 | A1* | 9/2005 | Wang | B60R 9/06 224/519 |
| 2007/0012634 | A1* | 1/2007 | Huang | B60R 9/10 211/17 |
| 2008/0073395 | A1* | 3/2008 | Reeves et al. | B60R 9/10 224/324 |
| 2008/0135697 | A1* | 6/2008 | Workman et al. | F16M 11/16 248/177.1 |
| 2011/0049208 | A1* | 3/2011 | Wang | B60R 9/06 224/520 |
| 2011/0240700 | A1* | 10/2011 | Williams | B60R 9/10 224/518 |
| 2012/0000952 | A1* | 1/2012 | Dreger et al. | B60R 9/10 224/533 |
| 2014/0151421 | A1* | 6/2014 | Loken | B60R 9/10 224/519 |

* cited by examiner